US005707053A

United States Patent [19]

Plunkett et al.

[11] Patent Number: 5,707,053

[45] Date of Patent: Jan. 13, 1998

[54] BLIND ALIGNMENT AND CLAMP UP TOOL

[75] Inventors: Mark R. Plunkett, Irvine; Marvin R. Hicks, Riverside, both of Calif.

[73] Assignee: Huck International, Inc., Tucson, Ariz.

[21] Appl. No.: 694,395

[22] Filed: Aug. 12, 1996

[51] Int. Cl.[6] .......... B23Q 1/00

[52] U.S. Cl. .......... 269/49; 269/153; 269/97; 269/79; 269/48.1

[58] Field of Search .......... 269/49, 47, 48.1, 269/52, 103, 153, 228, 234, 210, 219, 243, 97; 294/93, 97; 254/131

[56] References Cited

U.S. PATENT DOCUMENTS

| | | | |
|---|---|---|---|
| 698,601 | 4/1902 | Weathers | 269/210 |
| 2,672,839 | 3/1954 | Neuhaus . | |
| 3,012,772 | 12/1961 | Gunzner . | |
| 3,107,908 | 10/1963 | West | 269/79 |
| 3,300,847 | 1/1967 | Franklin et al. . | |
| 3,400,924 | 9/1968 | Arnold et al. | 269/228 |
| 3,671,063 | 6/1972 | Slayden . | |
| 3,883,129 | 5/1975 | Jones . | |
| 4,141,543 | 2/1979 | Kato | 269/228 |
| 4,369,957 | 1/1983 | Williams . | |
| 4,392,641 | 7/1983 | Dearman . | |
| 4,445,676 | 5/1984 | Tunkers . | |
| 4,718,266 | 1/1988 | Jarman et al. . | |
| 4,838,595 | 6/1989 | Spillar | 294/97 |
| 4,955,593 | 9/1990 | Yang | 269/79 |
| 5,289,817 | 3/1994 | Williams et al. | 294/97 |
| 5,303,908 | 4/1994 | Halder . | |
| 5,517,734 | 5/1996 | Korpi . | |
| 5,579,561 | 12/1996 | Smith et al. | 269/243 |

FOREIGN PATENT DOCUMENTS

| | | | |
|---|---|---|---|
| 489098 | 9/1924 | France | 269/49 |
| 234158 | 5/1911 | Germany | 269/103 |

*Primary Examiner*—Timothy V. Eley
*Assistant Examiner*—Lee Wilson
*Attorney, Agent, or Firm*—Harness, Dickey & Pierce, P.L.C.

[57] ABSTRACT

A clamping tool for removing the gap between and temporarily clamping workpieces together for subsequent fastening and having a cable actuated toggle member for engagement with one side of the workpieces and a nut member engageable with the opposite side of the workpieces.

23 Claims, 6 Drawing Sheets

BLIND ALIGNMENT AND CLAMP UP TOOL

SUMMARY BACKGROUND OF THE INVENTION

The present invention relates to apparatus for temporarily clamping workpieces together to facilitate the subsequent, permanent securement of the workpieces together.

In many structural applications it is desirable to secure workpieces such as structural members together by use of blind fasteners. However, frequently the workpieces in their prefastened condition are spaced apart at the desired fastening location whereby fastening can be inhibited or require the use of fasteners having a large grip capability. The present invention provides a unique clamping tool or device for temporarily clamping the workpieces together, thereby removing the space or gap therebetween and thus facilitating the application of permanent fasteners of a minimal or routine size for such workpieces. After the permanent fasteners have been installed the unique clamping device can be removed and used in other applications.

In this regard the clamping tool functions somewhat as a blind fastener since it can be applied and removed from one side of the workpieces being secured without the need for access to the other side. While it is believed that the device of the present invention will be most advantageously used in applications where blind fasteners are to be installed it can be used to temporarily clamp workpieces together for other purposes including, by way of example, fastening by non-blind fasteners and welding. The clamping tool can also be utilized to clamp the workpieces together to facilitate drilling of aligned holes through the workpieces for fasteners to be installed or for other processing.

Thus it is an object of the present invention to provide a unique device for temporarily clamping workpieces together to facilitate subsequent fastening.

It is another object to provide such a clamping device which can be applied and removed with access only to one side of the workpieces.

It is a general object of the present invention to provide a unique device for temporarily clamping workpieces together.

Other objects, features, and advantages of the present invention will become apparent from the subsequent description and the appended claims, taken in conjunction with the accompanying drawings, in which:

DESCRIPTION OF THE EMBODIMENTS OF THE INVENTION

Figure 1:
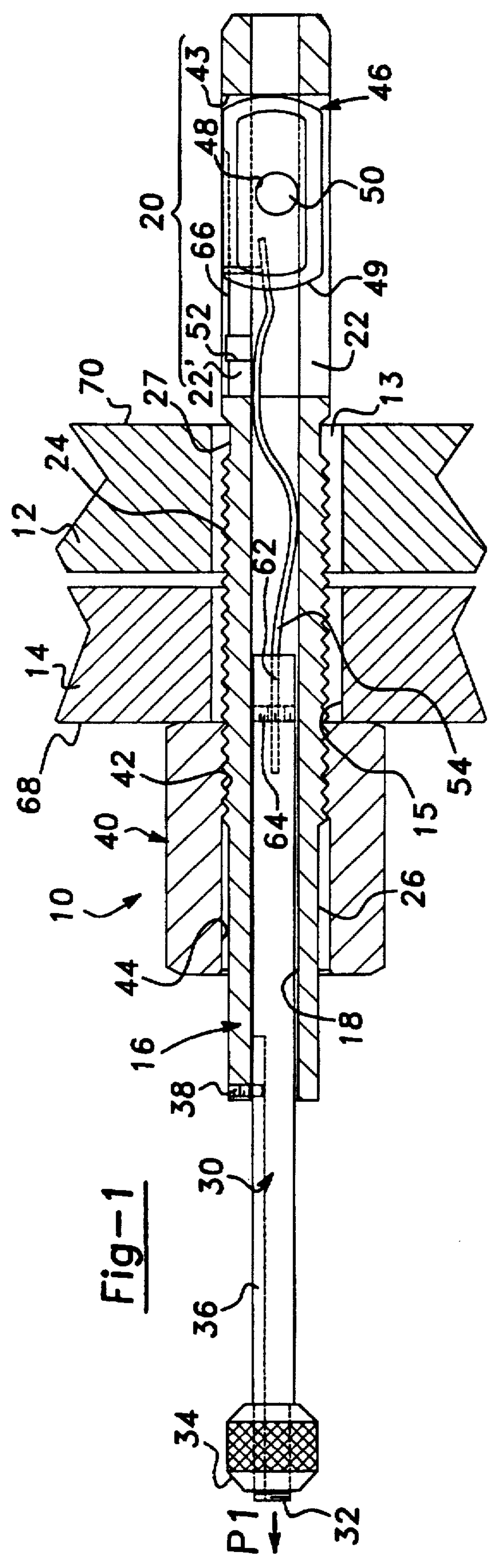
FIG. 1 is a longitudinal, partial sectional view depicting the clamping tool of the present invention being initially applied to a pair of spaced workpieces to be clamped together.
Figure 2:
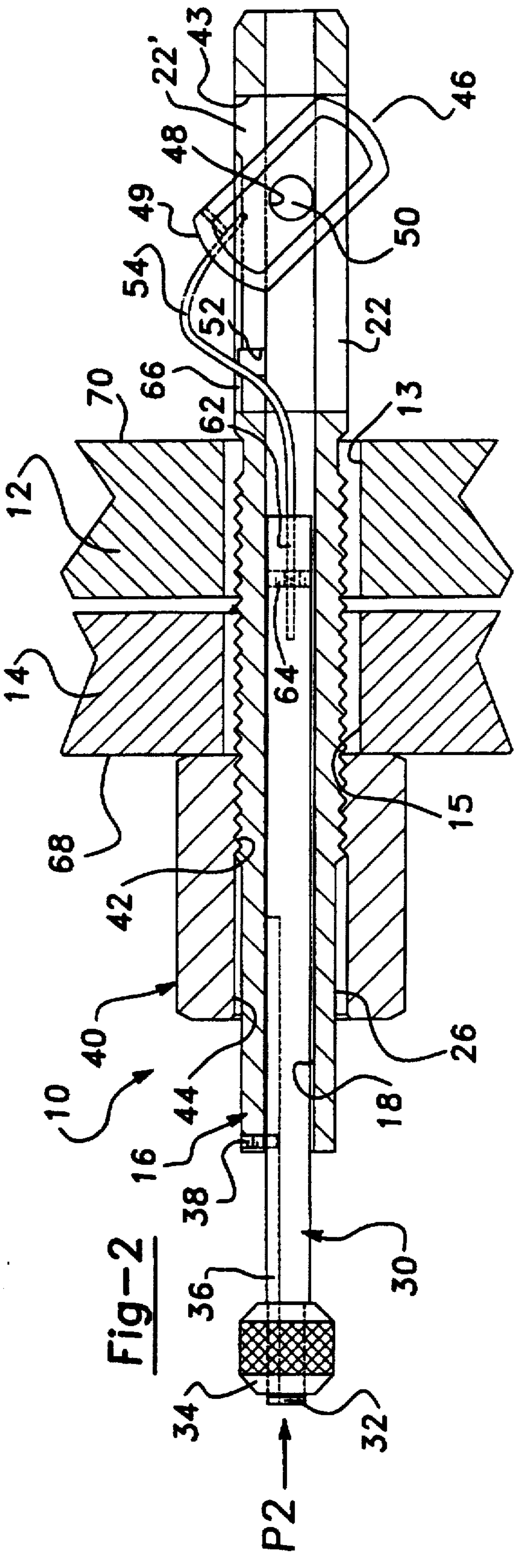
FIG. 2 is a view similar to FIG. 1 depicting the clamping tool being placed in a condition preparatory to clamping the workpieces together.
Figures 3, 6, 7:
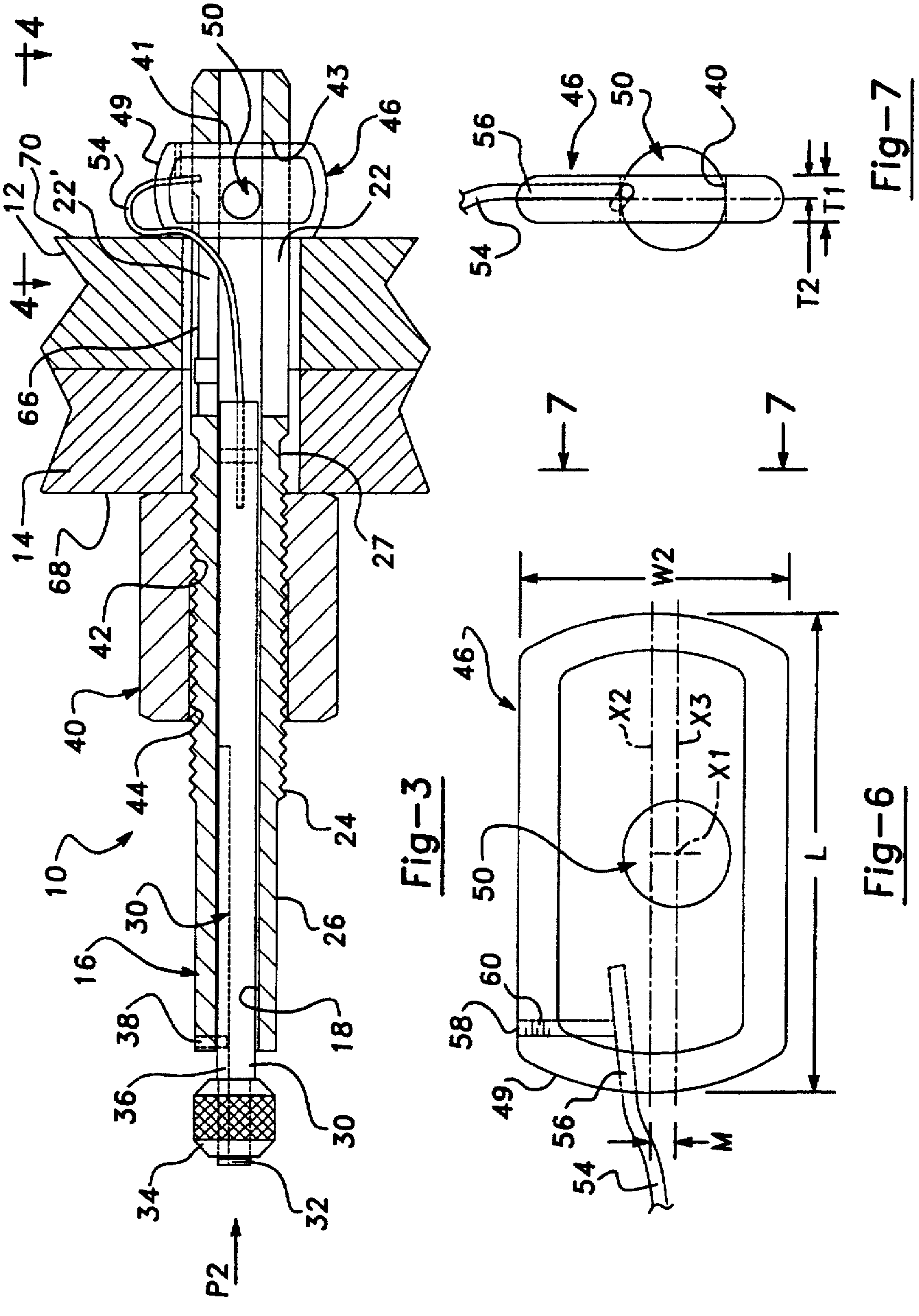
FIG. 3 is a view similar to FIGS. 1 and 2 depicting the clamping tool in its actuated condition clamping the workpieces together.
FIG. 6 is a front elevational view to enlarged scale of the toggle member and spherical ball assembly of the clamping tool.
FIG. 7 is an end elevational view of the toggle member of FIG. 6 taken in the direction of the Arrow 7.

Looking now to FIGS. 1–3 of the drawings, a clamping tool 10 is shown in assembly relationship with a pair of workpieces 12 and 14 having generally aligned bores 13 and 15, respectively. The clamping tool 10 includes an elongated pin member or support shaft 16 having an axially extending through bore 18. A slotted, inner end portion 20 of the support shaft 16 has a pair of diametrically opposite slots 22, 22' which are in communication with the confronting portion of the through bore 18. The slots 22, 22' have a width W1 (see FIG. 4) for a purpose to be seen. A threaded portion 24 is spaced from the slotted portion 20 by a thread relief groove 27. The diameter of the threaded portion 24 across the crest of the threads is generally the same as the diameter of the generally smooth slotted portion 20. An opposite, outer end portion 26 is of a reduced diameter and has a section 28 provided with a relatively light, straight knurl which serves a purpose to be described. The knurled section 28 provides a roughened surface to facilitate gripping by hand and/or a plier type device.

The clamping tool 10 further includes an actuator rod 30 having a generally uniform diameter and of a size to be slidingly received in the through bore 18 of support shaft 16 with a slight clearance fit. The actuator rod 30 terminates at its outer end in a reduced diameter, threaded portion 32. An enlarged knob member 34 is adapted to be threadably secured to the threaded portion 32 of the actuator rod 30. The knob member 34 can be fixed from rotation by the application a suitable plastic adhesive material such as the adhesive sold under the tradename LOCTITE "Red".

An axially extending anti-rotation groove 36 is provided at the outer end of the actuator rod 30. The groove 36 is adapted to receive a radially extending set screw 38 at the outer end portion 26 of the support shaft 16. In this way relative rotation between the support shaft 16 and actuator rod 30 is prevented while permitting relative axial movement therebetween.

An enlarged nut member 40 has a through bore with its forward or inner end portion 42 having an internal thread form adapted to threadably engage the threaded portion 24 of support shaft 16. The nut member 40 has a counterbored portion 44 at its rearward or outer end adapted to be received over the threaded portion 24 with a slight clearance. The outer surface of the nut member 40 is of a hexagonal or other well known irregular configuration (not shown) adapted to be gripped by a standard wrench or tool. The counterbored portion 44 permits the clamping tool 10 to be used with workpieces having a substantially reduced overall thickness from that as shown for the workpieces 12 and 14. In these applications the nut member 40 can be threaded onto the threaded portion 24 from the opposite end thereby permitting the adjacent section of the smooth inner end portion 20 of the support shaft 16 to be received in the counterbored portion 44 in a clearance relationship. At the same time the overall length of the nut member 40 can be optimized to facilitate gripping and turning by hand or by a suitable tool. In one form of the invention, a nut member 40 can be provided having its threaded end portion 42 with a minor or crest diameter of around 0.865 inches and a pitch diameter of around 0.895 inches. The counterbored portion 44 can be provided with a diameter of around 1.0 inches which provides clearance with the threaded portion 24 having a major or crest diameter of around 0.924 inches. The axial length of the nut member 40 can be around 3.0 inches with the axial length of the threaded portion 42 being around 1.0 inches and the axial length of the counterbored portion 44 being around 2.0 inches. The outer surface of the nut member 40 can be provided with a hexagonal shape with diametrically opposed flats being spaced around 1.75 inches apart. Thus the nut member 40 would have an overall length providing a significant engagement surface area for a wrench. At the same time the nut member 40 with the extended counterbored portion 44 permits the nut member 40 and hence the clamping tool 10 to be utilized with workpieces, such as workpieces 12 and 14, varying in total thickness over a significant range.

The clamping tool 10 includes a toggle member 46 which is of a generally flat, plate like construction having a generally rectangular shape. The toggle member 46 is of a thickness T1 (see FIG. 7) and is adapted to be slidably received in the slots 22, 22' with a slight clearance fit relative to the slot width W1. In this regard the width W1 of slots 22, 22' is substantially less than the diameter D1 (see FIG. 4) of the through bore 18 and in one form of the invention was around 30% less. The toggle member 46 has a through bore 48 having its axis X1 at a point midway along its length L (see FIG. 6). At the same time, however, the axis X1 is located slightly off center along the width W2 of the toggle member 46. Each of the four end surfaces of the toggle member 46 is curved having a diameter generally equal to the thickness T1. The curved surfaces facilitate sliding relative to surfaces engaged thereby during operation of the clamping tool 10. A hardened, spherical ball member 50 is adapted to be located in the through bore 48 in toggle member 46 with a slight clearance fit to permit rolling therein. At the same time, the ball member 50 and the associated bore 48 are of a diameter generally equal to the diameter D1 of the shaft bore 18 in support shaft 16 to provide rolling engagement with the bore surface. The slot 22' is provided with a radial bore 52 near its rearward end. The radial bore 52 is of a diameter to receive the ball member 50 in clearance relationship whereby the toggle member 46 with the ball member 50 in the ball retaining bore 48 can be moved through the slot 22' with the ball member 50 moving through the radial bore 52 until it is seated in the axial shaft bore 18.

The toggle member 46 is operably connected to the actuator rod 30 by a cable 54. Looking now to FIGS. 1–4, it can be seen that the cable 54 has one end connected to the longitudinal end 49 of the toggle member 46 by way of a longitudinal bore 56 (see FIGS. 6 and 7). A set screw 58 extends through a transverse bore 60 intersecting the longitudinal bore 56 whereby the end of the cable 54 in the longitudinal bore 56 can be clamped in place. The longitudinal bore 56 and hence the location of the connection of the end of the cable 54 is rearwardly offset from the longitudinal center line X2 of the toggle member 46 and is even farther offset from the longitudinal center line X3 of the transverse ball retaining bore 48 and associated spherical ball member 50. Since the toggle member 46 is mounted on the ball member 50 for pivotal movement about the axis X1 of the bore 48, and hence of the ball member 50, this offset provides a moment arm M between the connecting point of the cable 54 to the toggle member 46 and its axis X1 of rotation to thereby facilitate the pivotal actuation of the toggle member 46 by the actuator rod 30 through the cable 54.

In this regard the opposite end of the cable 54 is connected to the inner end of the actuator rod 30. That end of the cable 54 is located in an axial bore 62 in the inner end of the actuator rod 30 and is fixed there by one or more set screws 64 located in a radially intersecting through bore.

The cable 54 while flexible has sufficient stiffness to permit manipulation of the toggle member 46 by the axial movement of the actuator rod 30 pulling and pushing on the cable 54. In one form of the invention the cable 54 was of a 11×19 stranded stainless steel cable having a diameter of around 0.0625 inches.

Figure 5:
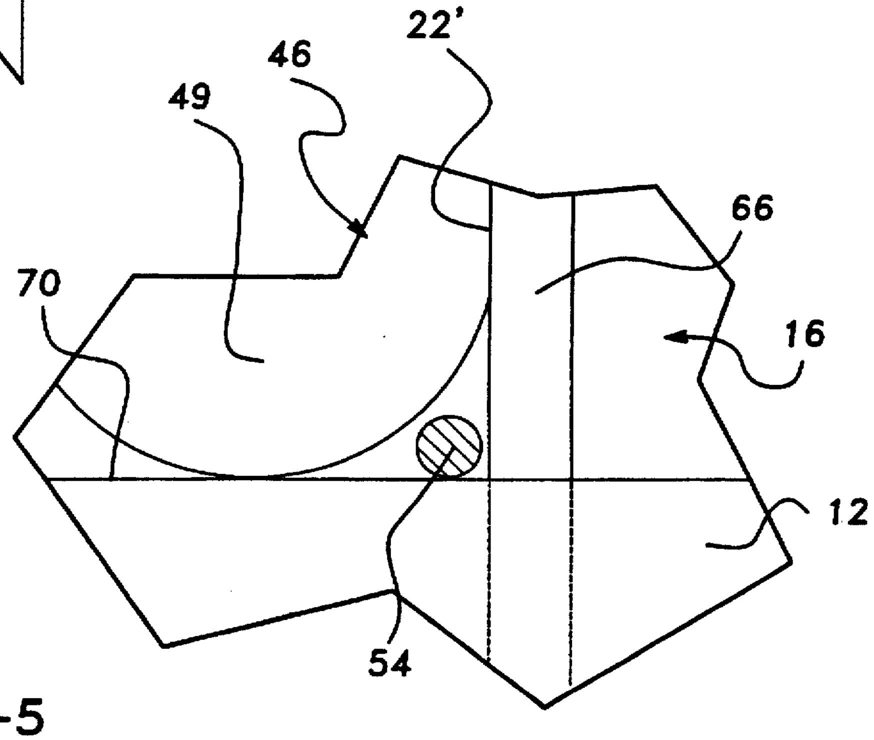
FIG. 5 is a fragmentary, sectional view to enlarged scale of the clamping tool and a workpiece generally taken generally in the area of the Circle 5 in FIG. 4.

The opposite radially outer sides of the slot 22' are chamfered to provide chamfered surfaces 66. The chamfered surfaces 66 along with the radius of curvature provided on the surface of the toggle member 46 adapted to engage the inside surface 70 of workpiece 12 provides clearance for the cable 54. This clearance inhibits the cable 54 from being caught between the engagement surface of the toggle member 46 and the inside surface 70 of the workpiece 12. This can be seen in FIG. 5 which illustrates the clearance provided. The chamfered surfaces 66 also act as a guide for the cable 54. In addition the angulation of the chamfer avoids sharp corners and thereby provides a smoother surface for engagement with the cable 54. It should also be noted that the point of connection of the cable 54 to the toggle member 46 is offset relative to the center line T2 midway along its thickness T1 (see FIG. 7). This tends to locate the cable 54 somewhat off center from the thickness midpoint and thus further assists in locating the cable 54 to one side thereby positioning the cable 54 away from the engaging surfaces and into the clearance provided by the toggle member 46 and slot 22'.

Looking now to FIG. 1, the clamping device 10 is initially placed in its pre-actuated condition by simply pulling, in the direction of the Arrow P1, on the actuator rod 30 and cable 54 to pivot the toggle member 46 to its reclined position in which it is generally completely within the confines of the support shaft 16. In this regard the width W2 of the toggle member 46 is generally around the outside diameter D2 of the inner end portion 20 of the support shaft 16. The inner end portion 20 of the support shaft 16 is then extended through the aligned bores 13 and 15 in workpieces 12 and 14 in a clearance relationship. In this condition the clamping device 10 and workpieces 12 and 14 are in the positions generally as shown in FIG. 1. Next the actuator rod 30 is pushed, in the direction of Arrow P2, into the through bore 18 of support shaft 16 acting on the cable 54 to pivot the toggle member 46 at least partially to an upright position as shown in FIG. 2. Now the nut member 40 is threaded further onto the threaded portion 24 of the support shaft 16 into engagement with the outer surface 68 of workpiece 14 while moving the toggle member 46 into engagement with the inner surface 70 of the workpiece 12. Further threading of the nut member 40 with the toggle member 46 now in its fully upright position will draw the workpieces 12 and 14 together to remove the gap therebetween as shown in FIG. 3. The nut member 40 can be torqued onto the threaded portion 24 by a wrench (not shown) having a standard, configuration matably engageable with the outer surface of the nut member 40.

Figure 4:
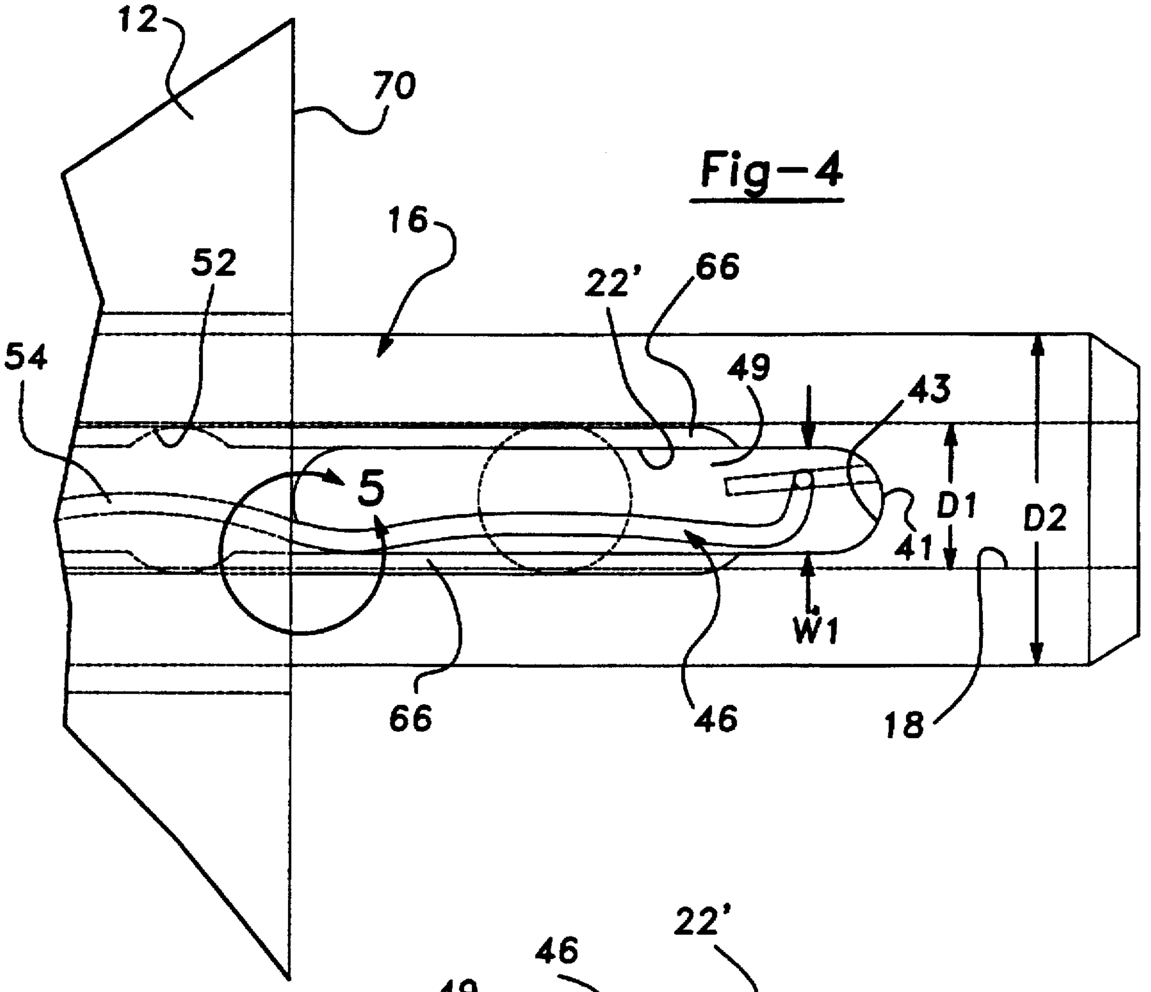
FIG. 4 top elevational fragmentary, sectional view to enlarged scale of the clamping tool and a workpiece of FIG. 3 shown in the actuated condition and taken generally along the lines of the Arrows 4—4 in FIG. 3.

In the fully clamped position of FIGS. 3 and 4, the innermost end 41 of the toggle member 46 is in full engagement with the similarly contoured inner end surface 43 of the slots 22, 22'. This provides not only substantial bearing surfaces to react the applied loads but also provides engaged components having a high shear and compressive strength at these locations. Now with the workpieces 12 and 14 firmly clamped together they can be permanently secured together by standard fasteners or some other means such as welding. With the workpieces 12 and 14 secured together the clamping device 10 can be actuated in the reverse order and returned to its condition of FIG. 1 for removal and use in other similar applications.

Thus a clamping device 10 of a relatively simple construction and operation has been provided for clamping workpieces together to facilitate their subsequent permanent connection.

Figure 8:
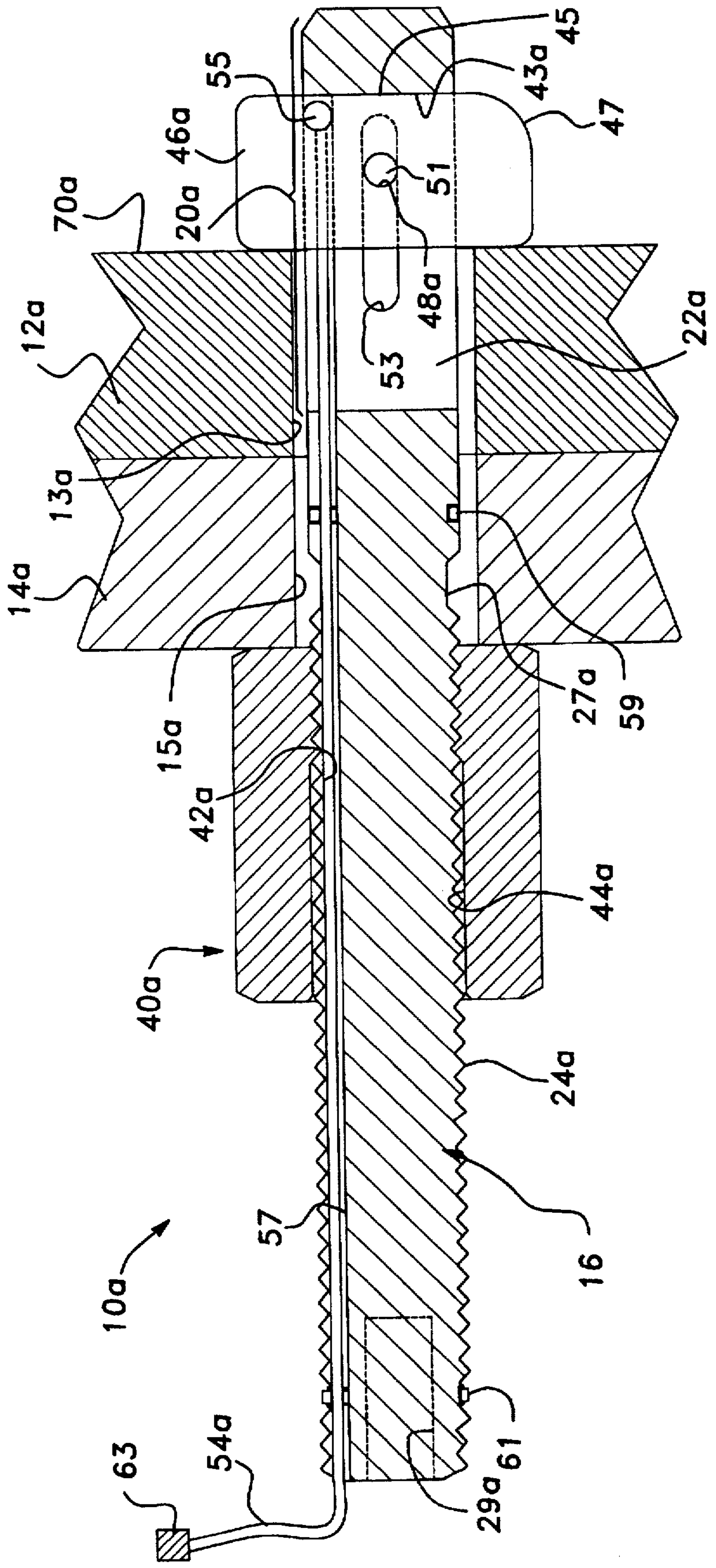
FIG. 8 is a longitudinal, partial sectional view similar to FIG. 3 depicting a modified form of clamping tool in its actuated condition clamping a pair of workpieces together.
Figure 9:
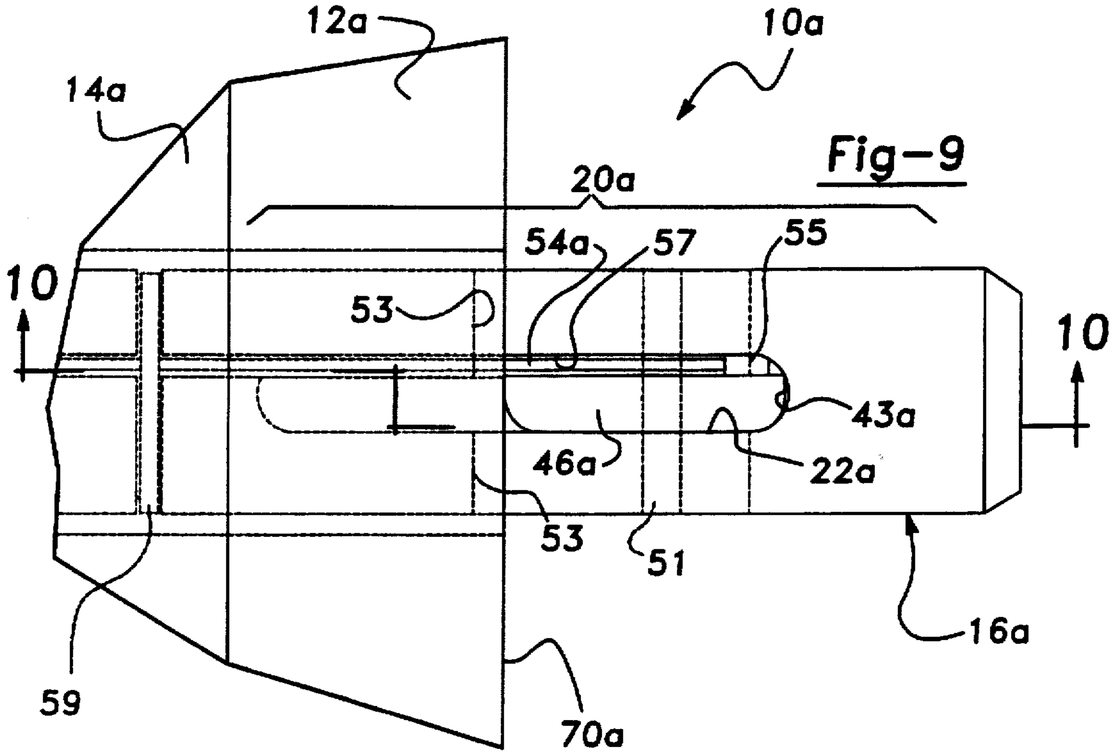
FIG. 9 is a fragmentary elevational view similar to FIG. 4 but depicting the modified form of the clamping tool of FIG. 8 taken generally along the lines of the Arrows 9—9 in FIG. 8.
Figure 10:
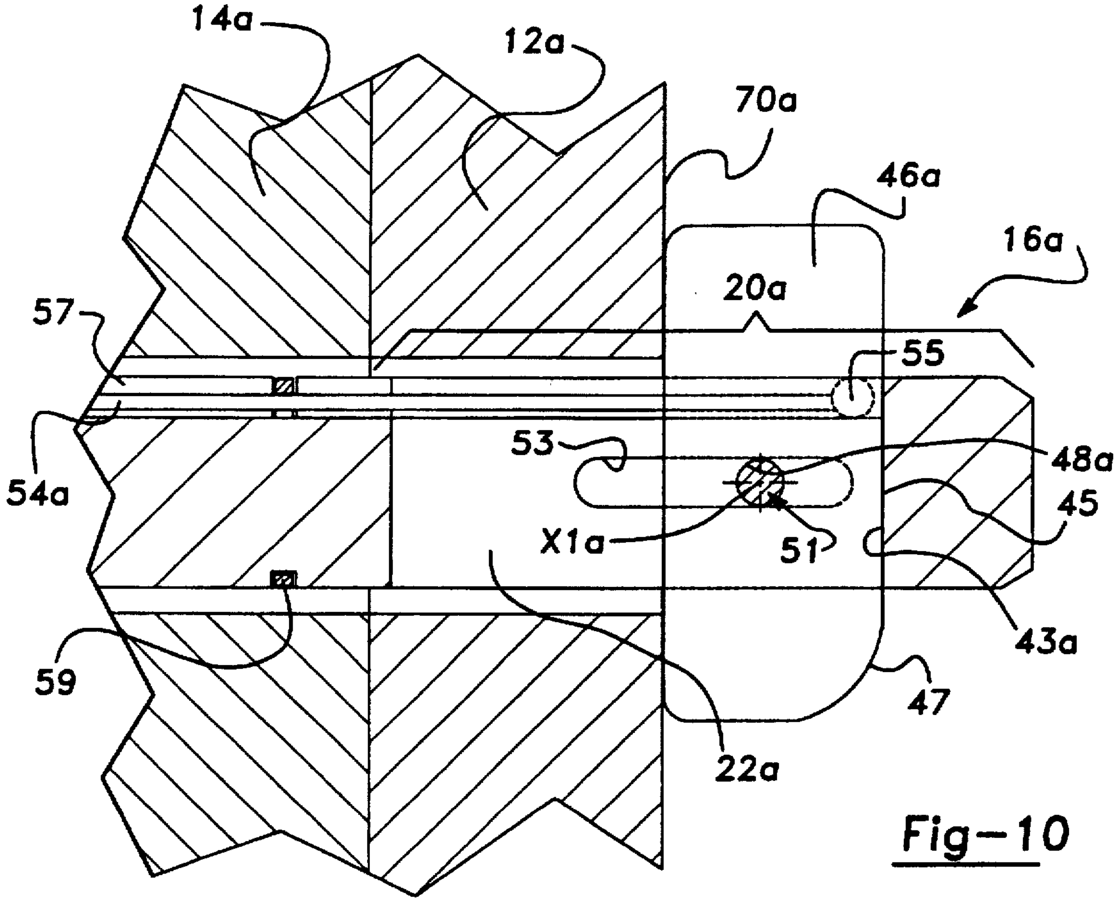
FIG. 10 is a sectional view of the clamping tool of FIGS. 8 and 9 taken generally along the lines of the Arrows 10—10 in FIG. 9.

A modified form of the invention is shown in FIGS. 8–10 where components similar to like components of the embodiment of FIGS. 1–7 have been given the same numeral designation with the addition of the letter postscript "a". Unless described otherwise the like numbered components can be considered to be of substantially the same construction and to function similarly. Thus, for purposes of brevity, the details of all components will not be repeated.

Looking now to FIGS. 8–10 of the drawings, the clamping tool **10*a* is shown in assembly relationship with workpieces 12*a* and 14*a* having generally aligned bores 13*a* and 15*a*, respectively. The clamping tool 10*a* includes an elongated, generally solid support rod 16*a* having a generally uniform maximum outer diameter. An inner end portion 20*a* of the support rod 16*a* has a diametrically extending through slot 22*a*. A threaded outer end portion 24*a* is spaced from the slotted portion 20*a* by a thread relief groove 27*a*. The free or outer end of the threaded portion 24*a* is provided with a plurality of flats 29*a*** to facilitate gripping by a tool and/or by hand.

An enlarged nut member **40*a* has a through bore with its forward or inner end 42*a* having an internal thread form adapted to threadably engage the threaded portion 24*a* of support rod 16*a*. The nut member 40*a* has a counterbored portion 44*a* at its rearward or outer end adapted to be received over the threaded portion 24*a* with a slight clearance. The nut member 40*a* is of substantially the same construction and function as nut member 40** of FIGS. 1–7 and hence those details will not be repeated here.

The clamping tool **10*a* includes a toggle member 46*a* which is of a generally flat, plate like construction having a generally rectangular shape. The toggle member 46*a* is of a thickness adapted to be slidably received in the slot 22*a* with a slight clearance fit relative to the slot width. The toggle member 46*a* has a through bore 48*a* having its axis X1*a* at a point midway along its length. At the same time, however, the axis X1*a* is located off center along the width of the toggle member 46*a*. The toggle member 46*a* has one corner 47 with a curved surface having a relatively large radius which in one embodiment was around 0.60 of the width of toggle member 46*a*. The curved or arcuate corner 47 facilitates sliding engagement relative to end surface 43*a* of the slot 22*a* engaged thereby during operation of the clamping tool 10*a*. An elongated, split spring type pin 51 is adapted to be located with resilient gripping, engagement in the through bore 48*a* in toggle member 46*a*. The support rod 16*a* has a pair of axially extending diametrically opposed guide slots 53 in quadrature with and which communicate with the slot 22*a*. At the same time, the pin 51 when resiliently installed in the bore 48*a* is of a diameter generally equal to the width of the guide slots 53** to provide sliding engagement therein with a reasonably close clearance fit.

The toggle member **46*a* is operably connected to an actuator cable 54*a*. The cable 54*a* has one end connected by a pivot pin 55 located at and pivotally connected to one side of the toggle member 46*a* near the end 45 which is adapted to engage the end surface 43*a* of the slot 22*a***.

The location of the connection of the end of the cable **54*a* is offset both widthwise and lengthwise from the center line of the pin 51. The pin 51 being on the axis X1*a* is itself offset along the width of the toggle member 46*a* while being located generally centrally along its length. The noted offset provides a moment arm between the connecting point of the cable 54*a* and pivot pin 55 to the toggle member 46*a* and the pivot axis X1*a* of rotation of the pin 51 to thereby facilitate the pivotal actuation of the toggle member 46*a* by the cable 54*a*. A groove 57 extends axially across the length of the threaded portion 24*a* of the support rod 16*a* into communication with the through slot 22*a*. The location of the pivot pin 55 and cable 54*a* place them at a level in line with and generally within the groove 57**.

Thus the actuator cable **54*a* and pivot pin 55 will be located in alignment with and within the groove 57 generally at all times. This arrangement literally precludes the cable 54*a* from being caught between the toggle member 46*a* and the inner surface 70*a* of the workpiece 12*a* during actuation and engagement. A snap ring 59 in a groove in the outer end of the end portion 20*a* further helps to retain the cable 54*a* within the groove 57. A second snap ring 61 is located within a groove at the outer end of the threaded portion 24*a* to maintain the cable 54*a* within the groove 57 generally throughout the associated length of the support rod 16*a* (see FIG. 8). A cap 63 can be applied to the free end of the cable 54*a* to facilitate hand actuation. With this structure chamfered surfaces, such as surfaces 66 in slot 22' of the embodiment of FIGS. 1–7, are not required or provided in slot 22*a* and in addition the associated end surfaces of the toggle member 46*a*** need not be extensively arcuately formed for clearance purposes as in the embodiment of FIGS. 1–7.

The cable **54*a* while flexible has sufficient stiffness to permit manipulation of the toggle member 46*a* by axially pulling and pushing on the cable 54*a*. The cable 54*a* can be of the same construction as cable 54** of FIGS. 1–7.

The operation of the clamping device **10*a* is substantially the same as that of the device 10 and can be operated in the same sequence as shown and described in conjunction with FIGS. 1–3 by simply pulling and pushing on the actuator cable 54*a* to pivot the toggle member 46*a* to its desired positions. Similarly the nut member 40*a* is applied in the manner of nut member 40 to clamp the workpieces 12*a* and 14*a*** firmly together as shown in FIGS. 8–10.

With the workpieces **12*a* and 14*a* firmly clamped together they can be permanently secured together by standard fasteners or some other means such as welding or subject to other operations as desired. Upon the completion of the desired operation, the clamping device 10*a*** can be actuated in the reverse order and returned to its deactivated condition for removal and use in other similar applications.

Figure 11:
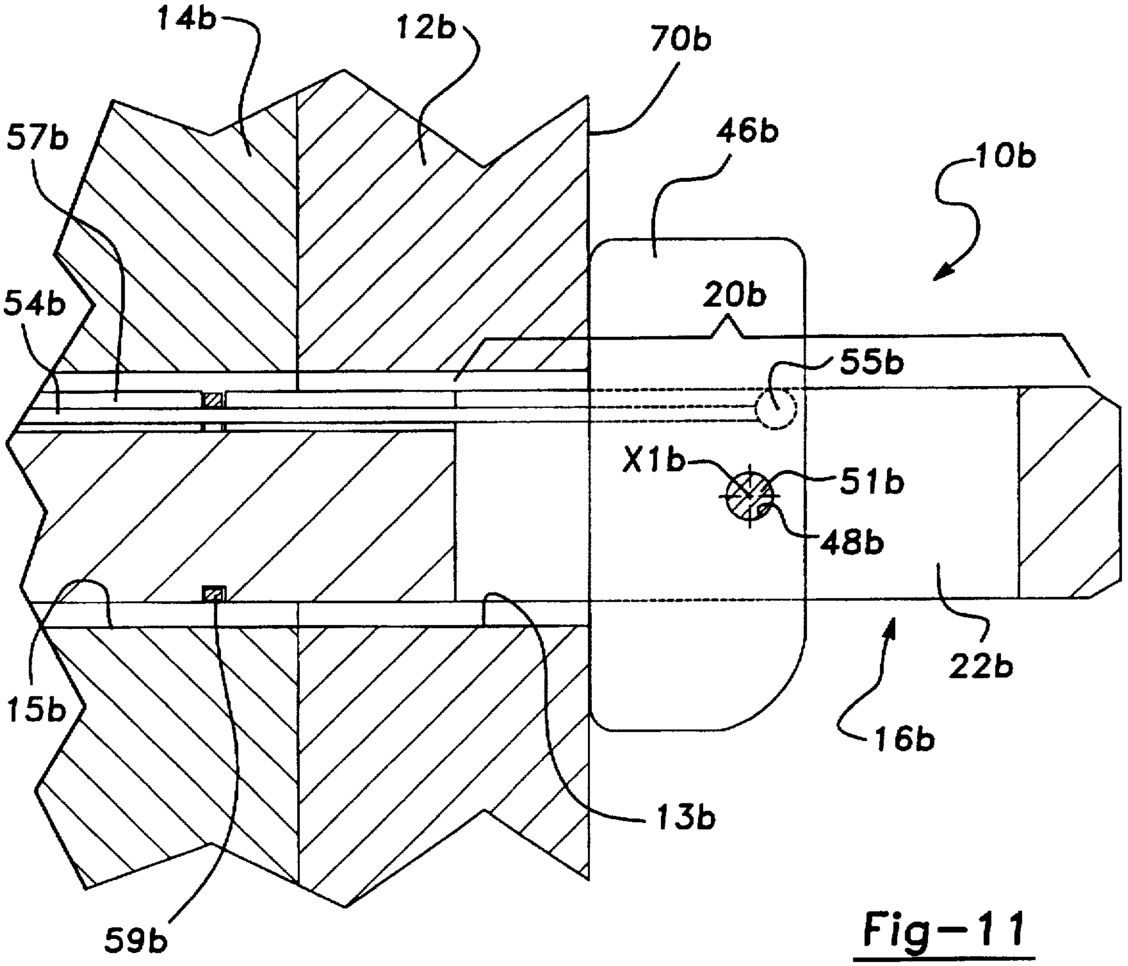
FIG. 11 is a fragmentary view similar to that of FIG. 10 but depicting another embodiment of clamping tool.

Another modified form of the invention is shown in FIG. 11 which is substantially identical to the embodiment of FIGS. 8–10 except here the toggle member is in a fixed pivotal position in a slot through the support rod. Thus in the description of the embodiment of FIG. 11 components similar to like components of the embodiment of FIGS. 8–10 have been given the same numeral designation with the addition of the letter postscript "b". Unless described otherwise the like numbered components can be considered to function similarly and thus generally only the details of the differences in construction and operation of the clamping tool of FIG. 11 relative to that of FIGS. 8–10 will be described for purposes of simplicity.

Looking now to FIG. 11 of the drawings, the clamping tool **10*b* is shown in assembly relationship with workpieces 12*b* and 14*b* having generally aligned bores 13*b* and 15*b*, respectively. The clamping tool 10*b* includes an elongated support rod 16*b* having an inner, end portion 20*b* with a diametrically extending through slot 22*b*. The support rod 16*b* is of essentially the same construction as support rod 16*a* except as shown and described. Thus the support rod 16*b* has a threaded outer end portion (not shown), such as end portion 24*a*, which is spaced from the slotted portion 20*b* by a thread relief groove (not shown) such as groove 27*b***.

The clamping tool **10*b* includes a toggle member 46*b* which is generally identical to toggle member 46*a*. The through bore 48*b*** and its axis X1*b* are substantially the same as the similarly numbered counterparts of FIGS. 8–10. In this construction, however, the support pin **51*b*, which is located in the through bore 48*b*, is pivotally supported in an axially fixed position in the slot 22*b***.

The toggle member **46*b* is operably connected to actuator cable 54*b* by a pivot pin 55*b* pivotally supported at one side of the toggle member 46*b* near the end 45*b***.

An offset similar to that of FIGS. 8–10 provides a moment arm between the connecting point of the cable **54*b* and pivot pin 55*b* to the toggle member 46*b* and the pivot axis of the support pin 51*b* to facilitate the pivotal actuation of the toggle member 46*b* by the cable 54*b*. As with the embodiment of FIGS. 8–19 a groove 57*b* extends axially across the length of the threaded portion 24*b* of the support rod 16*a* into communication with the through slot 22*b* with the pivot pin 55*b* and cable 54*b* located generally within the groove 57*b***.

Snap rings such as **59*b* at the outer end of the end portion 20*b* help to retain the cable 54*b* within the groove 57*b*** across its length.

The cable **54*b*, similarly to cables 54 and 54*a*, while flexible has sufficient stiffness to permit manipulation of the toggle member 46*b* by axially pulling and pushing on the cable 54*b***.

The operation of the clamping device **10*b* is similar to that of the devices 10 and 10*a* and can be operated in the same manner as shown and described in conjunction with FIGS. 1–3 and thus its operation is accomplished simply by pulling and pushing on the actuator cable 54*b* to pivot the toggle member 46*b* to its desired positions. The associated nut member (not shown), such as 40, 40*a*, is threaded further onto the threaded portion (not shown) such as threaded portion 24*b* of the support rod 16*b*, into engagement with the outer surface of workpiece 14*b* while moving the toggle member 46*b* into engagement with the inner surface 70*b* of the workpiece 12*b*. Further threading of the nut member with the toggle member 46*b* now in its fully upright position will draw the workpieces 12*b* and 14*b*** together to remove the gap as shown in FIG. 11.

With the workpieces **12*b* and 14*b* firmly clamped together they can be permanently secured together or operated upon as previously described after which the clamping device 10*a*** can be actuated in the reverse order and returned to its deactivated condition for removal and use in other similar applications.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A clamping tool for pulling together and clamping spaced apart workpieces with the workpieces having generally aligned openings and with a forward workpiece having a forward surface and a rearward workpiece having a rearward surface, said clamping tool comprising:
   - an elongated shaft member having a leading end and a trailing end and having an axial shaft bore extending from said trailing end to said leading end,
   - at least a portion of said shaft member at said leading end being of a size to extend through the aligned openings in a clearance relationship,
   - an actuating rod slidably supported in said shaft bore and being actuable from the trailing end of said shaft member,
   - said shaft bore having a slotted area including an axially extending slot in radial communication with said shaft bore at the leading end of said shaft member,
   - a toggle member slidably supported in said shaft bore at said slotted area and being pivotally supported for selective movement from a reclining position generally within the confines of said shaft member at said shaft bore and said slot for passage through the aligned workpiece openings from the forward surface and an upright position extending radially outwardly from said slot for engagement with the rearward surface of the rearward workpiece,
   - a flexible cable having one end secured to said toggle member and an opposite end secured to said actuating rod whereby sliding reciprocating motion of said actuating rod will selectively pivot said toggle member between its reclining position and its upright position,
   - said shaft member having an actuating portion intermediate its leading and trailing ends,
   - an actuating member movably mounted on said actuating portion and adapted to engage the forward surface of the forward workpiece and to be axially moved on said actuating portion to clamp the workpieces together when said toggle member is in its upright position in engagement with the rearward surface of the rearward workpiece with said actuating member in engagement with the forward surface of the forward workpiece.

2. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position.

3. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said toggle member having a retaining bore at said pivot axis, a ball member located in said retaining bore and being of a diameter for location within and rolling engagement with said shaft bore, said ball member supporting said toggle member for translational and pivotal movement within said shaft bore.

4. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said shaft member having an axially extending guide slot located in said slotted area transversely to said first slot, said toggle member having a retaining bore at said pivot axis, a ball member located in said retaining bore and being of a diameter for location within and rolling engagement with said shaft bore, said ball member supporting said toggle member for translational and pivotal movement within said shaft bore.

5. The clamping tool of claim 1 including anti-rotation means for preventing relative rotation between said shaft member and said actuating rod while permitting relative reciprocating movement of said actuating rod within said shaft bore.

6. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said cable connected to said toggle member at one end along its width and at a position laterally offset from the longitudinal line extending through said pivot axis whereby pivotal movement is facilitated.

7. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said pivot axis being offset in one direction from the longitudinally extending center line along the width of said toggle member, said cable connected to said toggle member at one end along its width and at a position offset from the longitudinal center line in a direction opposite from the offset of said pivot axis whereby pivotal movement is facilitated.

8. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said cable extending from said toggle member through said shaft bore to said actuating rod.

9. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said cable connected to said toggle member at one end along its width and at a position laterally offset from the longitudinal line extending through said pivot axis whereby pivotal movement is facilitated, said toggle member having an engaging surface for engaging the rearward workpiece surface with said engaging surface providing a clearance for said cable between said engaging surface and the rearward workpiece surface.

10. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said cable connected to said toggle member at one end along its width and at a position laterally offset from the longitudinal line extending through said pivot axis whereby pivotal movement is facilitated, said toggle member having an engaging surface along its width for engaging the rearward workpiece surface and an offset position at one side of its width for providing clearance for said cable when said engaging surface is in engagement with the rearward workpiece surface.

11. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said cable connected to said toggle member at one end along its width and at a position laterally offset from the longitudinal line extending through said pivot axis whereby pivotal movement is facilitated, said toggle member having an engaging surface along its width for engaging the rearward workpiece surface and an offset portion at one side of its width for providing clearance for said cable when said engaging surface is in engagement with the rearward workpiece surface, said slot being chamfered to provide a generally smooth engagement surface for said cable and to provide clearance with said cable.

12. The clamping tool of claim 1 with said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said toggle member having a through bore at said pivot axis, a ball member located in said through bore and being of a diameter for location within and rolling engagement with said shaft bore, said ball member supporting said toggle member for translational and pivotal movement within said shaft bore, a radially extending bore extending through said slot into communication with said shaft bore and being of a diameter to permit movement of said ball member therethrough for location within said shaft bore.

13. The clamping tool of claim 1 with said cable being of a flexible structure having a preselected stiffness to facilitate pivotal movement of said toggle member when actuated to apply a pushing force on said toggle member.

14. The clamping tool of claim 1 with said actuating portion being a threaded portion and with said actuating member being a nut member threadably engaged with said threaded portion for selective axial movement along said threaded portion.

15. A clamping tool for pulling together and clamping spaced apart workpieces with the workpieces having generally aligned openings and with a forward workpiece having a forward surface and a rearward workpiece having a rearward surface, said clamping tool comprising:

an elongated shaft member having a leading end and a trailing end and having an axial shaft bore extending from said trailing end to said leading end, said leading end of said shaft member having an outer surface of a size to permit said leading end to be inserted through the aligned openings with a radial clearance, an actuating rod slidably supported in said shaft bore and being actuable from the trailing end of said shaft member, said shaft bore having a pair of diametrically opposed slots in radial communication with said shaft bore at the leading end of said shaft member, a toggle member slidably supported in said shaft bore at said slotted area and being pivotally supported for selective movement from a reclining position generally within the confines of said shaft member at said shaft bore and said slots for passage through the aligned workpiece openings from the forward surface and an upright position extending radially outwardly from said slots for engagement with the rearward surface of the rearward workpiece and with the leading end of said slots whereby the clamp load is reacted through said toggle member and against the leading end of said slots, a flexible cable having one end secured to said toggle member and an opposite end secured to said actuating rod whereby sliding reciprocating motion of said actuating rod will selectively pivot said toggle member between its reclining position and its upright position, said shaft member having a threaded actuating portion intermediate its leading and trailing ends, a nut member threadably mounted on said threaded portion and adapted to engage the forward surface of the forward workpiece and to be threaded on said threaded portion to clamp the workpieces together when said toggle member is in its upright position in engagement with the rearward surface of the rearward workpiece with said nut member in engagement with the forward surface of the forward workpiece, said toggle member being of an elongated structure having a preselected length and width and a pivot axis located between opposite ends of its length and width and with said toggle member having its length generally parallel with the axis of said shaft bore when placed in the reclining position and generally transverse to the axis of said shaft bore when placed in the upright position, said toggle member having a retaining bore at said pivot axis, a ball member located in said retaining bore and being of a diameter for location within and rolling engagement with said shaft bore, said ball member supporting said toggle member for translational and pivotal movement within said shaft bore.

16. A clamping tool for pulling together and clamping spaced apart workpieces with the workpieces having generally aligned openings and with a forward workpiece having a forward surface and a rearward workpiece having a rearward surface, said clamping tool comprising:

an elongated shaft member having a leading end and a trailing end, said leading end of said shaft member having an outer surface of a size to permit said leading end to be inserted through the aligned openings with a radial clearance, a slotted area including an axially extending through slot at the leading end of said shaft member, a toggle member pivotally supported within said slot for selective movement from a reclining position generally within the confines of said shaft member at said slot for passage through the aligned workpiece openings from the forward surface of the forward workpiece and an upright position extending radially outwardly from said slot for engagement with the rearward surface of the rearward workpiece, a flexible cable having a leading end secured to said toggle member and an opposite trailing end operatively connected to said shaft member and actuable from the trailing end of said shaft member whereby reciprocating motion of said flexible cable will selectively pivot said toggle member between its reclining position and its upright position.

17. The clamping tool of claim 16 with said shaft member having an axially extending retaining groove extending from said through slot generally to the trailing end of said shaft member, said flexible cable being generally located within the confines of said retaining groove.

18. The clamping tool of claim 16 with said toggle member being pivotally secured in said through slot by an axially fixed support pin.

19. The clamping tool of claim 16 with said shaft member having an axial shaft bore extending into said leading end, said toggle member being of an elongated structure having a preselected length and width and a pivot axis located between opposite ends of its length and width and with said toggle member having its length generally parallel with the axis of said shaft bore when placed in the reclining position and generally transverse the axis of said shaft bore when placed in the upright position, said toggle member having a retaining bore at said pivot axis, a support pin located in said retaining bore and being of a diameter for location within and sliding engagement with said guide slot, said support pin supporting said toggle member for translational and pivotal movement within said shaft bore and said through slot.

20. The clamping tool of claim 16 with said toggle member being of an elongated structure having a preselected length and width and a pivot axis located between opposite ends of its length and width and with said toggle member having its length generally parallel with the axis of said shaft bore when placed in the reclining position and generally transverse the axis of said shaft bore when placed in the upright position, said toggle member having a retaining bore at said pivot axis, a ball member located in said retaining bore and being of a diameter for location within and rolling engagement with said shaft bore, said ball member supporting said toggle member for translational and pivotal movement within said shaft bore.

21. The clamping tool of claim 16 with said toggle member being of an elongated structure having a preselected length and width and a pivot axis located between opposite ends of its length and width and with said toggle member having its length parallel with said through slot when placed in the reclining position and generally transverse to said through slot when placed in the upright position, said shaft member having an axially extending guide slot located in said slotted area transversely to said through slot, said toggle member having a retaining bore at said pivot axis, a support pin located in said retaining bore and being of a diameter for location within and sliding engagement with said guide slot, said support pin supporting said toggle member for translational and pivotal movement within said through slot.

22. The clamping tool of claim 16 with said shaft member having an actuating portion, an actuating member movably mounted on said actuating portion and adapted to engage the forward surface of the forward workpiece and to be axially moved on said actuating portion to clamp the workpieces together when said toggle member is in its upright position in engagement with the rearward surface of the rearward workpiece with said actuating member in engagement with the forward surface of the forward workpiece.

23. The clamping tool of claim 16 with said shaft member having a threaded section, a nut member threadably mounted on said threaded section and adapted to engage the forward surface of the forward workpiece and to be axially advanced on said threaded section to clamp the workpieces together when said toggle member is in its upright position in engagement with the rearward surface of the rearward workpiece with said actuating member in engagement with the forward surface of the forward workpiece, said nut member having a through bore with a threaded portion at one end of said through bore for threadably engaging said threaded section and an enlarged counterbore at the opposite end of said through bore providing clearance with said threaded section whereby said nut member can be threadably applied to said threaded section from either said threaded section or said opposite end to accommodate use of said clamping tool with workpieces having a total thickness varying over a significant range.

* * * * *

UNITED STATES PATENT AND TRADEMARK OFFICE

CERTIFICATE OF CORRECTION

PATENT NO. : 5,707,053

DATED : January 13, 1998

INVENTOR(S) : Mark R. Plunkett & Marvin R. Hicks

It is certified that error appears in the above-identified patent and that said Letters Patent is hereby corrected as shown below:

Col. 1, line 61, after "4" insert --is a--

Col. 13, line 16, Claim 21, after "length" insert --generally--.

Signed and Sealed this

Twenty-fourth Day of March, 1998

*Attest:*

BRUCE LEHMAN

*Attesting Officer*

*Commissioner of Patents and Trademarks*